United States Patent

Fuchie

[15] 3,665,216

[45] May 23, 1972

[54] PULSE WIDTH MODULATION DETECTOR

[72] Inventor: Tadayoshi Fuchie, Tokyo, Japan

[73] Assignee: Kabushikikaisha Yokogawa Denki Seisakusho, (Yokogawa Electric Works, Ltd.), Tokyo, Japan

[22] Filed: Nov. 12, 1969

[21] Appl. No.: 875,807

[30] Foreign Application Priority Data

Nov. 22, 1968 Japan..................................43/85882
Nov. 22, 1968 Japan..................................43/85883

[52] U.S. Cl...............................307/234, 307/246, 307/254, 307/261, 323/18, 328/156, 328/162, 333/70 T

[51] Int. Cl.........................................................H03k 5/20

[58] Field of Search..................307/233, 234, 260, 261, 246, 307/254; 328/162, 156, 157, 127, 167; 323/73, 18

[56] References Cited

UNITED STATES PATENTS

| | | | |
|---|---|---|---|
| 2,782,267 | 2/1957 | Beck | 307/313 X |
| 3,238,383 | 3/1966 | Falk | 307/237 X |
| 3,304,508 | 2/1967 | Danielsen et al. | 328/164 |
| 3,317,756 | 5/1967 | Laporte | 307/233 X |
| 3,473,131 | 10/1969 | Perkins, Jr. | 328/163 |
| 3,032,714 | 5/1962 | Cohen | 307/293 X |

*Primary Examiner*—Donald D. Forrer
*Assistant Examiner*—R. C. Woodbridge
*Attorney*—Hill, Sherman, Meroni, Gross & Simpson

[57] ABSTRACT

An electric signal converter having two constant-current power sources, two electric circuits respectively including said two constant-current power sources, switches incorporated in said electric circuits, a signal source for turning on and off said switches, means for producing in said electric circuits electric signals having differential factors opposite to each other, and means for coupling said two electric circuits to combine said electric signals for providing a substantially constant composite signal.

2 Claims, 14 Drawing Figures

INVENTOR
Tadayoshi Fuchie

BY Hill, Sherman, Meroni, Gross & Simpson ATTYS

INVENTOR
Tadayoshi Fuchie

BY Hill, Sherman, Meroni, Gross & Simpson ATTYS.

PULSE WIDTH MODULATION DETECTOR

BACKGROUND OF THE INVENTION

1. Field of the Invention

This invention relates to an electric signal converter for converting a signal into an electric (voltage and/or current) signal in response to the pulse width of a pulse signal.

2. Description of the Prior Art ripple time constant

For converting a signal into a voltage signal according to the pulse width of a pulse signal, there has been well known a device of the type in which, for example, a DC power source, a switch and a smoothing circuit are connected together in series relation and the switch is turned on and off in response to the pulse width to derive a voltage signal from the smoothing circuit. In order to diminish the amount of ripple components present in the produced voltage signal, the conventional device requires a large of the time for smoothing circuit but too large a time constant has the drawback of lowering the response speed (conversion speed) of the output voltage signal to the input pulse signal.

SUMMARY OF THE INVENTION

The primary object of this invention is to provide a converter which is capable of converting an input pulse signal into an electric (DC voltage and/or current) signal with few ripple components and which has high conversion speed.

Another object of this invention is to provide a converter of this kind which is simple in construction.

Other objects, features and advantages of this invention will become apparent from the following description taken in conjunction with the accompanying drawings.

DESCRIPTION OF THE PREFERRED EMBODIMENTS

Figure 1:
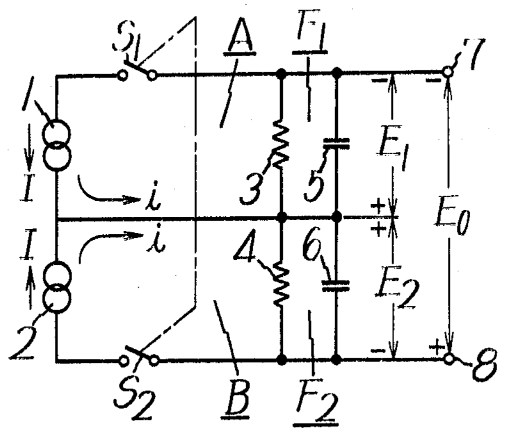
FIG. 1 is a circuit diagram showing one example of this invention.

In FIG. 1 there is illustrated one embodiment of this invention as applied to the production of a voltage signal proportional to the pulse width of a pulse signal. Reference numerals 1 and 2 indicate DC constant-current power sources. Reference characters $S_1$ and $S_2$ designate ganged switches, which are turned on and off in accordance with the pulse width of an input signal. Reference numerals 3 and 4 designate resistors, 5 and 6 capacitors, and 7 and 8 output terminals. The resistor 3 and the capacitor 5 are connected in parallel to each other to provide a filter circuit $F_1$, which is connected in series to the constant-current power source 1 through the switch $S_1$. The filter circuit $F_1$, the switch $S_1$ and the constant-current power source 1 constitute a closed loop circuit A. The resistor 4 and the capacitor 6 are connected in parallel to each other to provide a filter circuit $F_2$, which is connected to the constant-current power source 2 through the switch $S_2$. The filter circuit $F_2$, the switch $S_2$ and the constant-current power source 2 constitute a closed loop circuit B. The filter circuit $F_1$ of the closed loop circuit A and the filter circuit $F_2$ of the closed loop circuit B are connected in series to each other in such a manner that voltages respectively produced in the filter circuits $F_1$ and $F_2$ may be opposite in polarity to each other. Output terminals 7 and 8 are respectively connected to switches $S_1$ and $S_2$ and to both ends of the series circuit. Let it be assumed that the values of the resistors and the capacitances of the capacitors making up the filter circuits $F_1$ and $F_2$ are selected as follows:

$$R_1 > R_2$$

where $R_1$ is the resistance value of the resistor 3 and $R_2$ is the resistance value of the resistor 4, and $$C_1 = C_2$$

where $C_1$ is the electrostatic capacity of the capacitor 5 and $C_2$ is the electrostatic capacity of the capacitor 6. Assume that the constant currents from the constant-current power sources 1 and 2 are equal to each other, and they are indicated by I in the figure.

This circuit constructed as above described operates as follows.

Figures 2A, 2B, 2C, 2D:
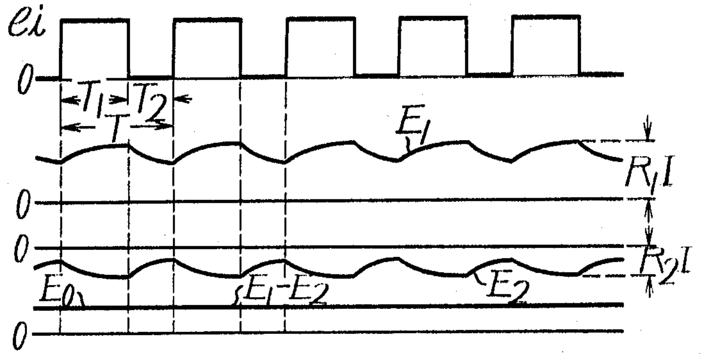
FIGS. 2A, 2B, 2C and 2D, inclusive, are diagrams for explaining the operation of the device exemplified in FIG. 1.

The switches $S_1$ and $S_2$ are held in the on state for a time corresponding to the on state of an input pulse signal $e_i$, that is, for a period $T_1$, and the switches are held in the off state for a time corresponding to the off state of the input pulse signal $e_i$, that is, for a period $T_2$, as shown in FIG. 2A. Under such conditions, the closed circuit A operates in the following manner. During the period $T_1$ during which the switch $S_1$ is in the on state, the constant current I from the constant-current power source 1 charges the capacitor 5 through the closed switch $S_1$. During the period $T_2$ when switch $S_1$ is in the off state, the charge stored in the capacitor 5 is discharged through the resistor 3. Consequently, as the switch $S_1$ is turned on and off in accordance with the input pulse signal $e_i$ in the manner set forth above, a voltage across the filter circuit $F_1$ (the capacitor 5 and the resistor 3) is connected to a DC voltage $E_1$ which includes ripple components. The mean value of the ripple components corresponds to the pulse width of the input signal $e_i$, as shown in FIG. 2B. The percentage of ripple in the DC voltage $E_1$ is dependent upon the time constant ($\tau_1 = R_1C_1$) of the filter circuit $F_1$ consisting of the resistor 3 and the capacitor 5. The steady state value of the DC voltage $E_1$ is determined value $R_1 \cdot I$ obtained by multiplying the resistance value $R_1$ of the resistor 3 by the constant current I. The closed circuit B similarly operates in the following manner. During time $T_1$ when the switch $S_2$ is in the on state, the constant current I from the constant-current power source 2 charges the capacitor 6 through the closed switch $S_2$. During period $T_2$ when the switch $S_2$ is in the off state, the charge stored in the capacitor 6 is discharged through the resistor 4. Consequently, when the switch $S_2$ is turned on and off in accordance with the input pulse signal $e_i$, a voltage across the filter circuit $F_2$ (capacitor 6 and the resistor 4) is connected to a DC voltage $E_2$ which is opposite in polarity to the aforementioned DC voltage $E_1$ and includes ripple components. The mean value of the ripple components corresponds to the pulse width of the input signal $e_i$, as depicted in FIG. 2C. The ripple percentage in the DC voltage $E_2$ is dependent upon the time constant ($\tau_2 = R_2C_2$) of the filter circuit $F_2$ consisting of the resistor 4 and the capacitor 6. Further, the steady value of the DC voltage $E_2$ is determined by the value $R_2 \cdot I$ obtained by multiplying the resistance value $R_2$ of the resistor 4 by the constant current I. As a result, a difference voltage $E_1 - E_2$ between the DC voltages $E_1$ and $E_2$ is derived between the output terminals 7 and 8 and has the form of a DC output voltage $E_0$ as shown in FIG. 2D. The filter circuits $F_1$ and $F_2$ are connected to each in such a manner that the DC voltages $E_1$ and $E_2$ respectively produced in the filter circuits are opposite in polarity and the resistance value $R_1$ of the resistor 3 is selected to be greater than the resistance value $R_2$ of the resistor 4, so that the DC voltage $E_1$ exceeds $E_2$ ($E_1 > E_2$) and so that the ripple components in the DC voltages $E_1$ and $E_2$ cancel each other. Accordingly, the DC output voltage $E_0$ is a DC voltage such as shown in FIG. 2D which has few ripple components and which has an amplitude that corresponds to the pulse width of the input signal $e_i$. Although the constant currents of the constant-current power sources 1 and 2 are selected to be equal to each other and the resistance values of the resistors 3 and 4 are selected to be different from each other, the same results can be obtained by selecting different values for the constant currents of the constant-current power sources 1 and 2 and by selecting the same resistance values for the resistors 3 and 4 to be equal.

The foregoing operation will hereinbelow be described again in connection with particular frequencies ranges.

The input signal $e_i$ comprises a switching waveform $f(t)$ for the switches $S_1$ and $S_2$ can be expressed by the following equation:

$$f(t)=\sum_{n=0}^{\infty}(an\cos n\omega t+bn\sin n\omega t)$$
$$=a_0+\sum_{n=1}^{\infty}(an\cos n\omega t+bn\sin n\omega t)$$
$$=\frac{T_1}{T}+\sum_{n=1}^{\infty}(an\cos n\omega t+bn\sin n\omega t)\quad(1)$$

where $$a_0=\frac{1}{T}\int_0^T f(t)dt=\frac{T_1}{T},\qquad T=\frac{2\pi}{\omega}$$
$$an=\frac{2}{T}\int_0^T f(t)\cos n\omega t dt$$
$$bn=\frac{2}{T}\int_0^T f(t)\sin n\omega t dt$$

Accordingly, if the constant currents of the constant-current power sources 1 and 2 are taken as I, currents $i$ flowing in the filter circuits $F_1$ and $F_2$ are given as follows:

$$i(t)=I\cdot f(t)\ .\ .\ .\ .\quad 2.$$

The DC voltage $E_1$ produced in the filter circuit $F_1$ (across the resistor 3) is given by the following equation:

$$E_1=i(t)\cdot\frac{R_1}{1+j\omega C_1R_1}$$
$$=I\cdot f(t)\cdot\frac{R_1}{1+j\omega C_1R_1}$$
$$=\frac{T_1}{T}R_1I+\frac{R_1I}{1+j\omega C_1R_1}\sum_{n=1}^{\infty}(an\cos n\omega t+bn\sin n\omega t)\quad(3)$$

If $\omega C_1R_1>>1$ in the equation (3), the equation (3) can be approximated to the following equation (4).

$$E_1=\frac{T_1}{T}R_1I+\frac{I}{j\omega C_1}\sum_{n=1}^{\infty}(an\cos n\omega t+bn\sin n\omega t)\quad(4)$$

Similarly, the DC voltage $E_2$ produced in the filter circuit $F_2$ (across the resistor 4) is given as follows:

$$E_2=\frac{T_1}{T}R_2I+\frac{I}{j\omega C_2}\sum_{n=1}^{\infty}(an\cos n\omega t+bn\sin n\omega t)\quad(5)$$

From the equations (4) and (5) the DC output voltage $E_0$ is expressed by the following equation (6).

$$E_0=E_1-E_2$$
$$=\left\{\frac{T_1}{T}R_1I+\frac{I}{j\omega C_1}\sum_{n=1}^{\infty}(an\cos n\omega t+bn\sin n\omega t)\right\}$$
$$-\left\{\frac{T_1}{T}R_2I+\frac{I}{j\omega C_2}\sum_{n=1}^{\infty}(an\cos n\omega t+bn\sin n\omega t)\right\}$$
$$=\frac{T_1}{T}I(R_1-R_2)+I\left\{\left(\frac{1}{j\omega C_1}-\frac{1}{j\omega C_2}\right)\right.$$
$$\left.\sum_{n=1}^{\infty}(an\cos n\omega t+bn\sin n\omega t)\right\}\quad(6)$$

If $C_1=C_2$ in the equation (6), the equation (6) is expressed by the following equation (7).

$$E_0=(T_1)/(T)\ I(R_1-R_2)\ .\ .\ .\ .\quad 7.$$

As is apparent from the equation (7), the DC output voltage $E_0$ is composed of only DC components and has no harmonic components and consequently includes no ripple components and is in proportion to the pulse width $T_1/T$ of the input pulse signal $e_i$. It is a matter of course that if $R_1<R_2$ in the equation (7), a DC output voltage of the opposite polarity can be obtained.

Figure 3:
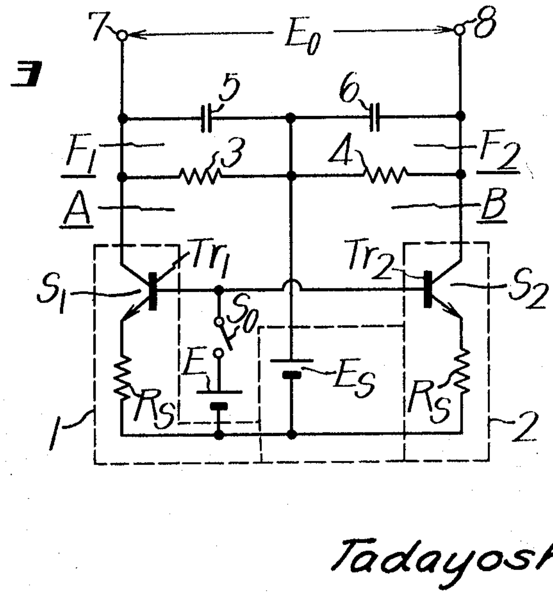
FIG. 3 is a specific circuit diagram of the device shown in FIG. 1.

FIG. 3 illustrates a specific circuit diagram of the device shown in FIG. 1, in which similar elements to those in FIG. 1 are identified by the same reference numerals and characters. In the present example the switches $S_1$ and $S_2$ are transistors $Tr_1$ and $Tr_2$ which are driven by a switch $S_0$. The switching transistors $Tr_1$ and $Tr_2$ are of the base-grounded type to also constitute the constant-current power sources 1 and 2, too. This will hereinbelow be described in detail. For example, the bases of two npn-type transistors $Tr_1$ and $Tr_2$ are interconnected and the emitters are connected to each other through a pair of resistors $R_S$. The negative electrode of a DC power source E is connected to the connection point between the resistors $R_S$ and the positive electrode is connected through the switch $S_0$ to the bases of the transistors $Tr_1$ and $Tr_2$. A DC power source $E_S$ has its negative terminal connected to the connection point of the resistors $R_S$ and its positive terminal connected to the connection point between the filter circuits $F_1$ and $F_2$. The DC power source E is a base bias power source for the transistors $Tr_1$ and $Tr_2$ and the power source $E_S$ is a drive source for the transistors.

A description will be given of the operation of the above circuit. If, the switch $S_0$ is opened and closed in accordance with the input pulse signal $e_i$, the switching transistors $Tr_1$ and $Tr_2$ will be turned on and off, and there will be derived between the output terminals 7 and 8 a DC output voltage which is proportional to the pulse width $T_1/T$ of the input pulse signal $e_i$.

Figure 4:
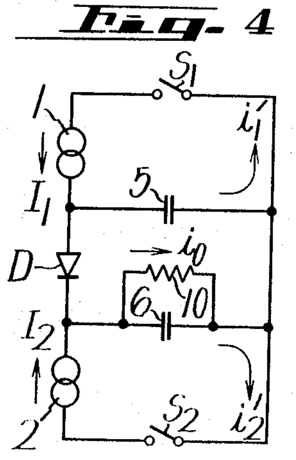
FIG. 4 is a circuit diagram showing a modified form of this invention.
Figures 5A, 5B, 5C, 5D, 5E, 5F:
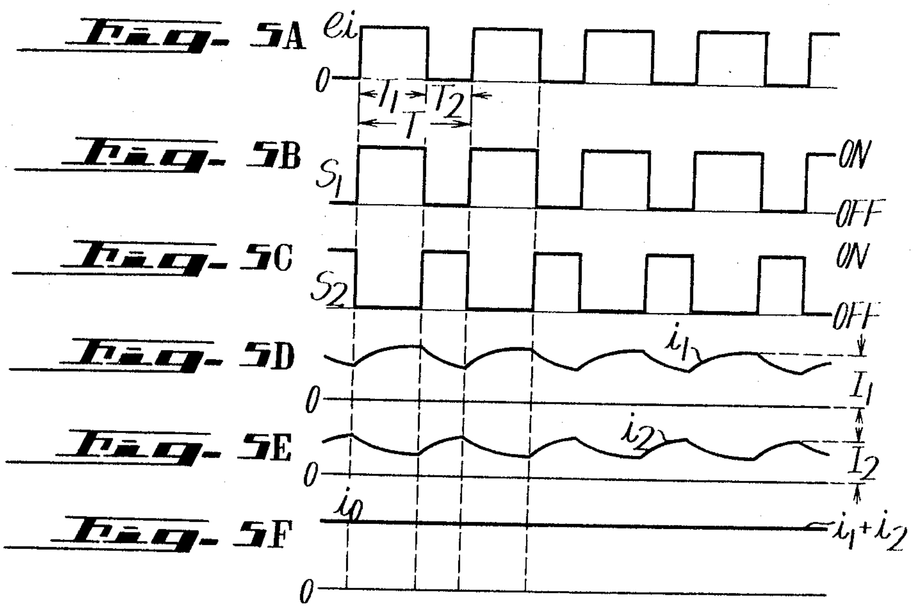
FIGS. 5A, 5B, 5C, 5D, 5E and 5F, inclusive, are diagrams for explaining the operation of the device of FIG. 4.

FIG. 4 is a circuit diagram illustrating another example of this invention as applied to the production of a current signal proportional to the pulse width $T_1/T$ of the input pulse signal $e_i$, in which similar elements to those in FIGS. 1 and 3 are identified by the same reference numerals and characters. Reference character D designates a diode inserted between the DC constant-current power sources 1 and 2. In the present example the switches $S_1$ and $S_2$ are designed to be alternately turned on and off in accordance with the input pulse signal $e_i$. In the event that the circuit is supplied with the input pulse signal $e_i$ such as shown in FIG. 5A in which reference characters $T_1$ and $T_2$ respectively indicate periods during which the pulse is in the on and off states and T its repeating period, the switch $S_1$ is in the on state in the period $T_1$ during which the pulse is in the on state and the switch $S_1$ is in the off state in the period $T_2$ during which the pulse is in the off state, as shown in FIG. 5B. While, the switch $S_2$ is in the off state in the period $T_1$ and in the on state in the period $T_2$ as depicted in FIG. 5C.

In the illustrated example the constant-current power source 1 is connected in series to a capacitor 5 through the switch $S_1$ and the capacitor 5 is connected in parallel to a parallel circuit of a capacitor 6 and a resistor 10 through the diode D. The constant-current power source 2 is connected in series to a parallel circuit of the capacitor 5 and the resistor 10 through the switch $S_2$. Let it be assumed that the constants of the circuits are selected as follows:

$$I_1=n_0\cdot I_2$$
$$C_1=(n_0-1)C_2$$

where $I_1$ is constant current from the constant-current power source 1, $I_2$ is constant current from the constant-current power source 2, $n_0$ is an integer, $C_1$ is the capacitance of the capacitor 5 and $C_2$ is the capacitance of the capacitor 6.

A description will hereinbelow be given of the operation of the circuit constructed as above described.

When supplied with the input pulse signal $e_i$ shown in FIG. 5A, the switches $S_1$ and $S_2$ are turned on and off respectively corresponding to the input pulse signal as depicted in FIGS. 5B and 5C in the manner described above. Assuming a circuit connected in series to the switch $S_1$, the constant current $I_1$ from the constant-current power source 1 flows into a parallel circuit of the capacitors 5 and 6 through the switch $S_1$ in the period $T_1$ during which the switch $S_1$ is in the on state and the switch $S_2$ is in the off state. Provided that no charge has been stored in the capacitors 5 and 6, a charge of $I_1\Delta t$ coulombs is stored in the capacitors 5 and 6 in $\Delta t$ seconds after the flowing of the constant current $I_1$ thereinto, so that the capacitors are charged up to a voltage $I_1 \cdot \Delta t/(C_1 + C_2)$. As a result of this, a current $I_1 \cdot \Delta t/\{(C_1 + C_2)R\}$ is shunted to the resistor 10 and this current exponentially rises up to the constant current $I_1$ of the constant-current power source 1. In the period $T_2$ during which the switch $S_2$ is in the off state, the charges stored in the capacitors 5 and 6 are discharged through the resistor 10, so that the current flowing through the resistor 10 falls exponentially. Accordingly, when the switch $S_1$ is repeatedly turned on and off in accordance with the input pulse signal $e_i$ as depicted in FIG. 5B, the current $i_1$ flowing through the resistor 10 becomes a current signal which includes ripple components and in which the mean value of the ripple components corresponds to the pulse width $T_1/T$ of the input pulse signal $e_i$, as shown in FIG. 5D. The quantity of the ripple components present in the DC current signal $i_1$ depends upon the resistance value of the resistor 10 and the capacitances of the capacitors 5 and 6 and the steady value of this DC current is equal to the value of the constant current $I_1$ of the constant-current power source 1. Assuming a circuit connected in series to the switch $S_2$, in the period $T_2$ during which the switch $S_2$ is in the on state but the switch $S_1$ is in the off state, the constant current $I_2$ from the constant-current power source 2 flows into the capacitor 6 through the switch $S_2$ (but the current $I_2$ is blocked by the diode D and hence does not flow into the capacitor 5). The capacitor 6 is charged up to a voltage of $I_2 \cdot \Delta t/C_2$ in $\Delta t$ seconds after the flowing of the constant current $I_2$ into the capacitor 6. Consequently, a current of $I_2 \cdot \Delta t/C_2R$ is shunted to the resistor 10 and this current rises up to the constant current $I_2$ of the constant-current power source 2 in an exponential manner. In the period $T_1$ during which the switch $S_2$ is in the off state, the charge of the capacitor 6 is discharged through the resistor 10, so that the current flowing in the resistor 10 falls exponentially. Accordingly, where the switch $S_2$ is repeatedly turned on and off corresponding to the pulse width $T_2/T$ of the input pulse signal $e_i$ as shown in FIG. 5C, the current $i_2$ flowing in the resistor 10 takes the form of a current signal such as depicted in FIG. 5E which includes ripple components and in which the mean value of the ripple components corresponds to the pulse width $T_2/T$ of the input pulse signal $e_i$. The ripple percentage in the DC current signal $i_2$ depends upon the resistance value of the resistor 10 and the capacitance of the capacitor 6. As a result of this, the overall output DC current signal $i_0$ flowing in the resistor 10 becomes a current $i_1 + i_2$ such as shown in FIG. 5F in which the ripple components of the currents $i_1$ and $i_2$ are added together to minimize the ripple components and which has an amplitude which corresponds to the pulse width $T_1/T$ of the input pulse signal $e_i$.

The foregoing operation will hereinbelow be described again in connection with frequency response.

The input signal $e_i$ and consequently the switching waveform $f_1(t)$ of the switch $S_1$ can be expressed generally by the following equation:

$$f_1(t) = \sum_{n=0}^{\infty} (an \cos n\omega t + bn \sin n\omega t)$$

$$= a_0 + \sum_{n=1}^{\infty} (an \cos n\omega t + bn \sin n\omega t)$$

$$= \frac{T_1}{T} + \sum_{n=1}^{\infty} (an \cos n\omega t + bn \sin n\omega t) \quad (11)$$

where $$a_0 = \frac{1}{T}\int_0^T f_1(t)dt = \frac{T_1}{T}, \quad T = \frac{2\pi}{\omega} \text{ and}$$

$$a_n = \frac{2}{T}\int_0^T f_1(t) \cos n\omega t dt$$

$$bn = \frac{2}{T}\int_0^T f_1(t) \sin n\omega t dt$$

Accordingly, the current $i_1'$ flowing in the switch $S_1$ is given by the following equation (12):

$$i_1' = I_1 f_1(t) \ldots \quad 12.$$

The current $i_1(t)$ flowing in the resistor 10 is as given by the following equation (13):

$$i_1(t) = i_1'(t) \cdot \frac{1}{1 + j\omega(C_1 + C_2)R}$$

$$= I_1 f_1(t) \cdot \frac{1}{1 + j\omega(C_1 + C_2)R}$$

$$= \frac{T_1}{T} I_1 + \frac{I_1}{1 + j\omega(C_1 + C_2)R} \sum_{n=1}^{\infty} (an \cos n\omega t + bn \sin n\omega t) \quad (13)$$

If $\omega(C_1 + C_2)R >> 1$ in the equation (13), the equation (13) can be approximated to the following equation (14):

$$i_1(t) = \frac{T_1}{T} I_1 + \frac{I_1}{j\omega(C_1 + C_2)} \sum_{n=1}^{\infty} (an \cos n\omega t + bn \sin n\omega t) \quad (14)$$

While, the switching waveform $f_2(t)$ of the switch $S_2$ is as given by the following equation (15):

$$f_2(t) = \frac{T_2}{T} + \sum_{n=1}^{\infty} (an \cos n\omega t + bn \sin n\omega t)$$

$$= I - \frac{T_1}{T} + \sum_{n=1}^{\infty} (an \cos n\omega t + bn \sin n\omega t) \quad (15)$$

Therefore, the current $i_2(t)$ flowing in the resistor 10 through the switch $S_2$ is as given by the following equation (16):

$$i_2(t) = I_2 \cdot f_2(t) \cdot \frac{1}{1 + j\omega C_2 R}$$

$$= I_2 - \left[\frac{T_1}{T} I_2 + \frac{I_2}{1 + j\omega C_2 R} \sum_{n=1}^{\infty} (an \cos n\omega t + bn \sin n\omega t)\right] \quad (16)$$

If $\omega C_2 R >> 1$ in the above equation (16), the equation (16) can be approximated to the following equation (17):

$$i_2(t) = I_2 - \left[\frac{T_1}{T} I_2 + \frac{I_2}{j\omega C_2} \sum_{n=1}^{\infty} (an \cos n\omega t + bn \sin n\omega t)\right] \quad (17)$$

Therefore, the overall output DC current $i_0(t)$ flowing in the resistor 10 can be expressed by the following equation (18):

$$i_0(t) = i_1(t) + i_2(t)$$

$$= \frac{T_1}{T} I_1 + \frac{I_1}{j\omega(C_1 + C_2)} \sum_{n=1}^{\infty} (an \cos n\omega t + bn \sin n\omega t)$$

$$+ I_2 - \left[\frac{T_1}{T} I_2 + \frac{I_2}{j\omega C_2} \sum_{n=1}^{\infty} (an \cos n\omega t + bn \sin n\omega t)\right] \quad (18)$$

If $I_1 = n_0 I_2$ and $C_1 = (n_0 - 1)C_2$ in the equation (18), the equation (18) is as given by the following equation (19):

$$i_0(t) = \frac{T_1}{T} n_0 I_2 + \frac{n_0 I_2}{j\omega n_0 C_2} \sum_{n=1}^{\infty} (an \cos n\omega t + bn \sin n\omega t)$$

$$+ I_2 - \left[\frac{T_1}{T} I_2 + \frac{I_2}{j\omega C_2} \sum_{n=1}^{\infty} (an \cos n\omega t + bn \sin n\omega t)\right]$$

$$= (n_0 - 1) \frac{T_1}{T} I_2 + I_2 \quad (19)$$

As is apparent from the equation (19), the DC output current $i_0$ is composed of only DC components and has no harmonic components and hence has no ripple components and is proportional to the ratio of the pulse width $T_1/T$ of the input pulse signal $e_i$.

Figure 6:
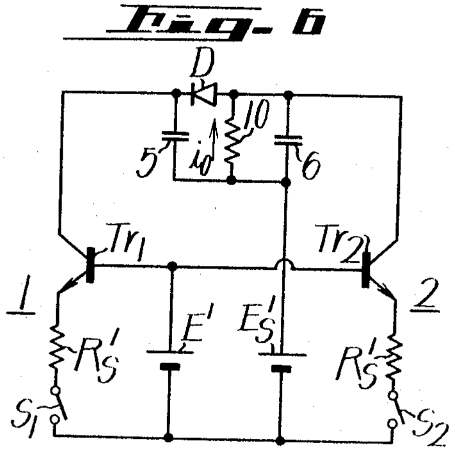
FIG. 6 is a specific circuit diagram of the device shown in FIG. 4.

FIG. 6 is a practical circuit diagram of the device shown in FIG. 4, in which similar elements to those in FIG. 4 are identified by similar reference numerals and characters. In the present example the bases of two, for example, npn-type transistors $Tr_1'$ and $Tr_2'$ are connected to each other. The emitters of the transistors are also connected to each other through a resistor $R_S'$ and the switch $S_1$ and $R_S'$ and $S_2$, respectively, as shown. Between the connection point of the bases of the transistors $Tr_1'$ and $Tr_2'$ and a point intermediate the switches $S_1$ and $S_2$, there is inserted a DC power source E' in such a manner that its positive electrode is connected to the bases of the transistors to bias them suitably. Further, another DC power source $E_S'$ is connected between the connection point of the switches $S_1$ and $S_2$ and one of the connection point of capacitors 5, 6 and a resistor 10 in a manner so that the negative electrode of the DC power source $E_S'$ is connected to the switches. In the present example the constant-current power sources 1 and 2 are made up of the grounded-base type transistors $Tr_1'$ and $Tr_2'$ which are driven by the switches $S_1$ and $S_2$ and DC power source $E_S'$. Further, in the present example a resistor 10 may be a load or a reactance element. A diode D is connected between the collectors of the transistors.

With the present invention, a pulse signal can be converted into a DC voltage or current signal of little ripple components by the use of a simple circuit, as has been above described in detail. Further, the capacitances of the capacitors used in the present invention need not be extremly large, so that the present invention provides a converter of high conversion speed for converting an electric signal according to a pulse signal into a voltage or current signal.

It will be apparent that many modifications and variations may be effected without departing from the scope of the novel concepts of this invention.

I claim:

1. A detector for converting pulse width modulated signals to a DC signal comprising:
   - two constant-current power source means including two grounded base type transistors;
   - a DC bias power source means connected to the bases of said two transistors;
   - two switch means each connected between said DC bias source and each of the emitters of said two transistors;
   - an input pulse signal source to which a signal component is applied with a duty ratio for turning on and off the switch means in correspondence with the duty ratio;
   - a diode connected between the collectors of said two transistors;
   - a series circuit of two capacitors connected in parallel to said diode;
   - a second DC power source connected between the connection point of the two capacitors and the junction point of said switch means; and
   - a pair of output terminals connected across either of said two capacitors and producing a DC signal without ripple components with said DC signal corresponding to the duty ratio of the input pulse signal.

2. A detector for converting pulse width modulated signals to a DC signal comprising:
   - two constant-current power source means;
   - two switch means respectively connected to said two constant-current power source means;
   - two electrical circuit means connected to said switch means and said constant-current power source means;
   - said two switch means operated in synchronism with each other;
   - an input pulse signal source applied to said switch means, and said input pulse signal source having a duty ratio of $T_1/T$ for synchronously turning on and off the switch means in correspondence with the duty ratio and wherein $T_1$ represents a time modulated pulse and T represents the repetitive period of said pulse;
   - means for producing in said two electrical circuits electrical signals which contain ripple components that vary in accordance with the duty ratio and in which the ripple components are opposite to each other;
   - means for differentially coupling the two signals produced in said two electrical circuits to produce a substantially constant composite DC signal with no ripple components, the DC signal having an amplitude corresponding to the duty ratio, and output terminals to which said DC signal is applied; and
   - wherein a diode is connected between the two constant-current power source means.

* * * * *